Aug. 19, 1958 P. B. EVANS 2,847,930
BUTTER DISH-BRUSH ATTACHMENT FOR TOASTERS
Filed April 19, 1956 2 Sheets-Sheet 1

INVENTOR.
PAULINE B. EVANS
BY *Pauline B. Evans*

Aug. 19, 1958 P. B. EVANS 2,847,930
BUTTER DISH-BRUSH ATTACHMENT FOR TOASTERS
Filed April 19, 1956 2 Sheets-Sheet 2

INVENTOR.
PAULINE B. EVANS
BY Pauline B. Evans

United States Patent Office 2,847,930
Patented Aug. 19, 1958

2,847,930
BUTTER DISH-BRUSH ATTACHMENT FOR TOASTERS

Pauline B. Evans, Bartlesville, Okla.

Application April 19, 1956, Serial No. 579,229

1 Claim. (Cl. 99—339)

My invention is an attachment for a conventional toaster.

More specifically, my invention is a novel and useful attachment for an electric toaster, which attachment is comprised of coacting and interdependent parts employed in cooperation with a conventional toaster.

I have found that it is most desirable to have the butter, oleomargarine, and the like materials in a spreadable condition for easy and convenient application to toasted bread slices. To effect this spreadable condition for these materials, it is usually necessary to apply heat to same. That is, the above mentioned materials are normally stored under refrigeration conditions when not in use (to prevent spoilage, contamination, etc.). Sudh refrigeration normally results in these materials being in solid-like form which form is not desired in order that the material can be easily spread upon toast. Such hard butter, oleo, etc., when applied by a knife to the toast very frequently results in breakage of the toast, results in chunks of the applied material in an unappetizing form on the toast, etc.

The prior art has not, to the best of my knowledge, solved this problem satisfactorily. I believe that my apparatus, to be more thoroughly described hereinbelow, is an advancement in this field and has presented a desired solution to the problems conventionally encountered in spreading a food material on toasted bread.

The various features of novelty and cooperation of the interdependent parts which make up the apparatus of my invention are pointed out with particularity in the claim attached hereto and form a part of this specification. For a better understanding of the invention and the advantages possessed by it, reference should be had to the accompanying drawings and descriptive matter in which I have illustrated and described preferred embodiments of my invention.

Figure 1:
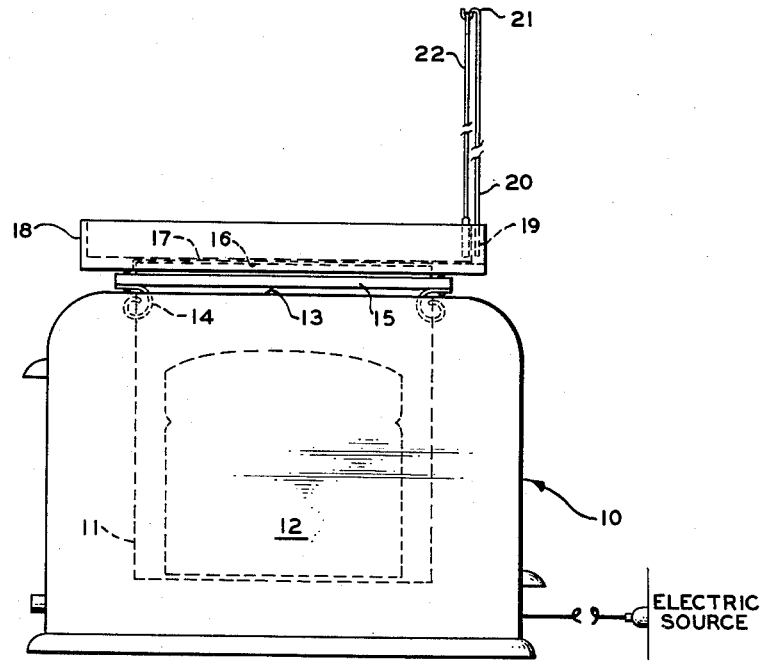
Figure 1 is a side view of the conventional electric toaster employing the apparatus device of my invention, showing one embodiment of the container hanger means of my invention.

Referring now to Figure 1, 10 designates the conventional electric toaster to which is attached, in cooperation and in interdependency, the butter dish apparatus of my invention. In this specific embodiment, 11 represents the inner section of the toaster wherein the bread slice 12 is toasted. Details of the conventional toaster are not shown for sake of simplicity. Attached to the toast outlet 13 by means of rolled springs 14 is support plate 15 with the raised triangular-shaped portion 16, adapted to coact with the indented triangular-shaped portion 18 located in the underside of the container or dish 18. Of course, these triangular-shaped portions may be reversed; that is the support plate 15 may have the indented form and the dish may have the coacting protruding portion. Also, it is not critical that these portions be triangularly shaped; it being within the skill of the art to make any desired configuration to enable the dish and support plate to be removably attached to one another. Recess 19 in the vertical side of the dish 18 is adapted to receive the brush support rod 20 having a hook means 21, here shown to be a U-shaped structure for illustration, which hook holds the removably attached conventional pastry brush 22, the brush-end of which is located in the inner part of the dish 18. In this dish is placed the food material which is to be conditioned to spreadability by the heat from the electric toaster 10. Various modifications can be made on the above illustration of one embodiment of my invention without departing from the spirit and scope of my invention.

Figure 2:
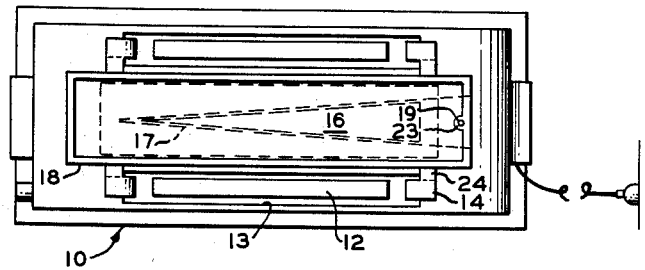
Figure 2 is a plan view of Figure 1.

Figure 2 is a plan view of Figure 1 absent the brush support rod 20 and brush 22. The same numbers used in referring to Figure 1 are used to indicate the same componet parts in Figure 2. In Figure 2 recess 19 is shown located in an enlarged section 23 of the vertical side of dish 18. Also shown are extensions 24 which are attached to springs 14 and attached to the bottom side of support plate 15.

Figure 3:
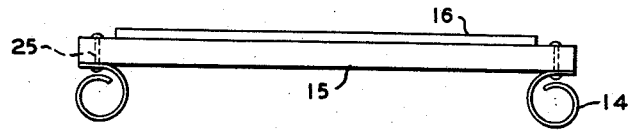
Figure 3 is a side view of one embodiment of the support device of my invention.

Figure 3 shows the specific structure of the support plate of the modification shown in Figure 1. Shown additionally in Figure 3 are means such as rivets holding the rolled spring structure affixed to the plate 15.

Figure 4:
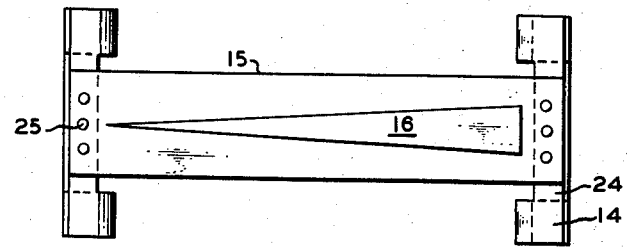
Figure 4 is a plan view of Figure 3.

Figure 4 is a plan view of Figure 3 showing the extensions 24 on the springs 14 and the means 25 employed to attach the springs 14 by means of rivets 25 holding extensions 24 to plate 15.

Figures 5, 6:
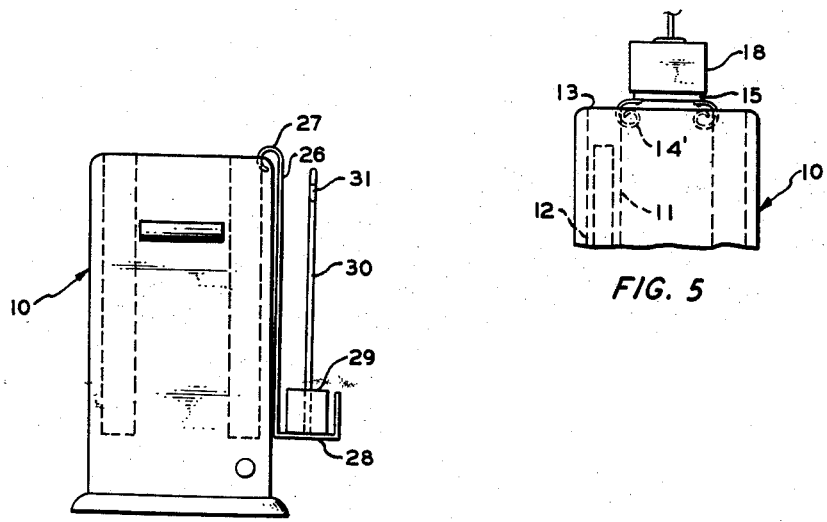
Figure 5 is an end view of another modification of the support means of my invention.
Figure 6 is an end view of still another embodiment of my invention.

Figure 5 shows another modification of the support and dish of my invention with like parts numbered as in Figure 1. The rolled springs 14' in this modification are adapted to removably attach the support 15 to the longitudinal interior sides of the toast outlets.

Figure 6, showing still another modification of my invention, depicts the conventional toaster 11 having re- longitudinal edge of one of said toast outlets by means of arcuate hook means 27 at one end of plate 26. The opposite end of plate 26 is formed into the shape of an open-ended trough 28 adapted to frictionally hold and to support container 29. Attached to the trough 28 is the holder 30 with a single hook means 31 to which is removably attached (not shown) a conventional pastry brush. The brush-end of the pastry brush, of course, is contained in the inner part of the dish 29. Heat from the toaster is transferred through the toaster 10, the plate 26, and the dish 29 to properly condition the food material in dish 29 into a spreadable material.

While I have illustrated and described the best embodiments of my invention, it will be apparent to those skilled in the art that changes may be made in the form of the apparatus disclosed without departing from the spirit and scope of my invention as set forth in the appended claim.

Having now described my invention, what I claim as new and desire to secure by Letters Patent is:

In combination with an electric toaster of the conventional type, said toaster having two toast outlets in the upper horizontal face thereof, a container support means removably attached at the upper end thereof to the outer longitudinal edge of one of said toast outlets by means of an arcuate hook; said support means being in close proximity to said toaster at one side thereof; said support means having the other end formed into the shape of an open-end trough defined by two vertical plates attached on opposite sides of a bottom horizontal plate, said trough being adapted to frictionally hold and support a container therein; said support means having rigidly attached to the bottom of said trough near one end thereof a vertically disposed rod member having a single hook means thereon at the end of said rod opposite the locus of rigid attachment of said rod to said trough, said hook means being capable of supporting a removably mounted pastry brush with the brush-end of said pastry brush being in communication with the inside of said container.

References Cited in the file of this patent

UNITED STATES PATENTS

| | | |
|---|---|---|
| 2,493,222 | Braucht | Jan. 3, 1950 |
| 2,556,520 | Bunce | June 12, 1951 |
| 2,595,010 | Simpson | Apr. 29, 1952 |
| 2,639,658 | Biehls | May 26, 1953 |
| 2,640,600 | Farr | June 2, 1953 |
| 2,660,108 | Baer | Nov. 24, 1953 |
| 2,749,836 | Wedge | June 12, 1956 |